US009508235B2

(12) United States Patent
Suessemilch et al.

(10) Patent No.: US 9,508,235 B2
(45) Date of Patent: Nov. 29, 2016

(54) PROJECTION UNIT FOR A SELF-DIRECTING MOBILE PLATFORM, TRANSPORT ROBOT AND METHOD FOR OPERATING A SELF-DIRECTING MOBILE PLATFORM

(71) Applicant: Robert Bosch GmbH, Stuttgart (DE)

(72) Inventors: Irene Suessemilch, Stuttgart (DE); Christoph Rohrer, Stuttgart (DE); Ramona Roesch, Biberach-Warthausen (DE); Clemens Guenther, Ettlingen (DE); Yorck von Collani, Beilstein (DE); Stephanie Linder, Stuttgart (DE); Volker Fischer, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 113 days.

(21) Appl. No.: 14/447,501

(22) Filed: Jul. 30, 2014

(65) Prior Publication Data

US 2015/0042485 A1 Feb. 12, 2015

(30) Foreign Application Priority Data

Aug. 6, 2013 (DE) .................. 10 2013 215 409

(51) Int. Cl.
*G08B 5/00* (2006.01)
*G08B 5/36* (2006.01)
*G03B 21/20* (2006.01)
*B25J 9/16* (2006.01)
*G06F 19/00* (2011.01)

(52) U.S. Cl.
CPC .............. *G08B 5/36* (2013.01); *B25J 9/1674* (2013.01); *G03B 21/2093* (2013.01); *B60Q 2400/50* (2013.01); *G05B 2219/40196* (2013.01); *G05B 2219/40202* (2013.01); *G05B 2219/49157* (2013.01)

(58) Field of Classification Search
CPC ............ G08B 5/36; G08B 5/38; G08B 5/00; G08B 7/06; Y10S 901/01
USPC .................. 340/815.4; 700/258, 245, 255
See application file for complete search history.

(56) References Cited

U.S. PATENT DOCUMENTS

| | | | | |
|---|---|---|---|---|
| 9,002,511 B1* | 4/2015 | Hickerson | ............. | G01S 17/026 700/245 |
| 2008/0086236 A1* | 4/2008 | Saito | ..................... | G01S 5/0252 700/245 |
| 2009/0133467 A1* | 5/2009 | Mori | ..................... | G01C 19/00 73/1.77 |
| 2012/0290132 A1* | 11/2012 | Kokubo | ................. | B25J 9/1666 700/255 |
| 2013/0243247 A1* | 9/2013 | Sakaue | ................. | G01B 11/25 382/103 |
| 2013/0265502 A1* | 10/2013 | Huebner | ................. | G06T 15/20 348/789 |

(Continued)

FOREIGN PATENT DOCUMENTS

| | | |
|---|---|---|
| DE | 102 40 227 A1 | 3/2004 |
| DE | 20 2004 010 944 U1 | 11/2004 |
| DE | 10 2006 002 960 A1 | 7/2007 |

(Continued)

*Primary Examiner* — Jack K Wang
(74) *Attorney, Agent, or Firm* — Maginot, Moore & Beck LLP

(57) ABSTRACT

A projection unit for a self-directing mobile platform, in particular for a freely moving transport robot and/or for one or more freely moving transport devices of a transport robot, is characterized in that the projection unit is adapted for signal transmission for projecting the movement path of the mobile platform, wherein the projection takes place within the spatial vicinity of the mobile platform.

8 Claims, 2 Drawing Sheets

(56) References Cited

U.S. PATENT DOCUMENTS

2014/0316570 A1* 10/2014 Sun .................. B25J 9/1674
 700/255
2015/0032254 A1* 1/2015 Ishiguro ............ B25J 11/0005
 700/245

FOREIGN PATENT DOCUMENTS

| DE | 10 2011 081 394 B3 | 10/2012 |
| EP | 1 334 871 A2 | 8/2003 |
| JP | 2005-157873 A | 6/2005 |
| WO | 2009/063318 A1 | 5/2009 |

* cited by examiner

PROJECTION UNIT FOR A SELF-DIRECTING MOBILE PLATFORM, TRANSPORT ROBOT AND METHOD FOR OPERATING A SELF-DIRECTING MOBILE PLATFORM

This application claims priority under 35 U.S.C. §119 to patent application no. 10 2013 215 409.7, filed on Aug. 6, 2013 in Germany, the disclosure of which is incorporated herein by reference in its entirety.

The present disclosure relates to a projection unit for a self-directing mobile platform, to a self-directing mobile platform and to a method for operating a self-directing mobile platform.

BACKGROUND

Transport robots are used in various areas. For example, autonomous transport robots, which autonomously carry out the transport of various materials or samples, have already been used in hospitals. The robots move freely within the rooms, such as for example in corridors, halls or elevators. In order to avoid any danger from the freely moving transport robot to people in the vicinity of the transport robot, such transport robots are equipped for example with flashing lights which indicate that the transport robot is moving. Moreover, transport robots are generally equipped with sensors, for example laser sensors, which can detect an obstacle. In order to avoid collisions in particular with people, provision is generally made for reasons of safety to the effect that, if in doubt, the robot stands still until a person has moved out of the travel path. Furthermore, an evasive route (evasive trajectory) around the obstacle can be calculated and traveled. In addition to use in hospitals or care homes, such transport robots can also be effectively used in many other areas.

In industrial production halls, transport systems with freely moving units are likewise used. Here it is often the case that the freely moving units travel along fixed, marked paths. From the markings, staff can identify which path the transport system will take and react accordingly.

SUMMARY

The present disclosure proposes a projection unit for a self-directing mobile platform, with which operation of the mobile platform can be significantly improved. The self-directing mobile platform is, for example, an autonomous, freely moving transport robot and/or one or more freely moving transport devices of a transport robot, as can be used, for example, in industrial production facilities. The mobile platform can moreover also be provided for other applications, independent of transport. According to the disclosure, the projection unit is adapted for signal transmission for projecting the planned movement path of the mobile platform. The movement path is in this case projected within the spatial vicinity of the mobile platform. This projection unit can be used to make visible to people located within the spatial vicinity of the mobile platform the future planned movement path, wherein not only the movement path in the direct vicinity of the platform, but also the further movement path can be indicated. People can in this manner identify in which direction and on which path (trajectory) the mobile platform will move. Consequently, people can then react accordingly, for example by getting out of the way. In this manner, feelings of uncertainty and difficulties with acceptance on the side of the affected people can be avoided, since the movements of the self-directing mobile platform, that is to say for example the freely moving transport robot or the freely moving transport device, can be estimated much better, such that people no longer need to fear collision with the mobile platform. Up until now, it has been necessary for reasons of safety that, if in doubt, a transport robot must remain still so as not to endanger people in the region of the travel path. By projecting the movement path, it is substantially simpler for the affected people to not cross the travel path of the mobile platform such that the mobile platform can move along its movement path with substantially fewer obstacles, as a result of which a significant amount of time is saved during operation of the mobile platform.

The term "projection unit" generally refers to a unit which is suitable for transmitting a signal into a space or onto a surface area, in particular for transmitting an optical signal, but also, for example, an acoustic signal.

Expediently, the projection unit is adapted for optical signal transmission, such that the movement path can be indicated by way of optical signals in the spatial vicinity of the mobile platform. Optical signal transmission can moreover be supplemented and supported or possibly replaced, for example by acoustic signal transmission.

The signals are preferably projected on a floor and/or on one or more walls and/or on a ceiling within the spatial vicinity of the mobile platform. The projection can take place, for example, in the form of a virtual transport path on the ground. The virtual transport path can be indicated, for example, as a central interrupted line or a broad band. The virtual transport path preferably also indicates the width or outer contour of the mobile platform. However, provision may also be made for the indication to take place, depending on the relevant spatial layout, against the wall, for example at eye level of a person, and/or on a ceiling. The different possibilities can be combined with one another in order to optimize safety and recognizability for the affected people.

The virtual transport path or transport track represents the trajectory, on which the mobile platform will move. On the basis of this virtual track, people within the vicinity of the mobile platform can identify very easily in which direction the mobile platform will move and react accordingly. If the mobile platform must stop on account of a person, the projection unit can project a calculated evasive trajectory and thus encourage the person to vacate said path or to not step into that path.

In a preferred embodiment of the projection unit according to the disclosure, the movement path and in particular the virtual transport path are represented in an interrupted manner, for example in dashed and/or dotted form. The advantage of this is that, as compared to a solid line representation, the energy required for signal transmission is significantly reduced since only part of the travel path is illuminated. In addition it has been shown that people may be cautious about stepping onto a closed surface, such as a solid marking. By representing the virtual transport path in an interrupted manner, the acceptance of a transport robot equipped with a projection unit according to the disclosure by the affected people can thus be increased. In addition, what is achieved by the interrupted projection of the movement path is that this projection has, as it were, an instructive character, as opposed to a prohibition logic of a solidly marked trajectory projection, as a result of which the acceptance by the affected people can be increased further.

The projection of the movement path can preferably be supplemented, or possibly replaced, by texts and/or other graphic representations, such as symbols. With projected texts, further details or information can be communicated to the people situated within the spatial vicinity of the mobile platform. The same is true for symbols, with which simple and internationally applicable communication with the affected people is possible.

The movement path can be projected for example using a laser or conventional visible light. The projection unit therefore advantageously comprises a laser projection unit, for example a micro-laser projection unit, and/or a light projection unit for emitting visible light. Depending on the field of use of the transport robot, laser beams or conventional visible light may be preferred. Laser projection generally has the advantage that especially intense signals can be emitted. Since a safety risk to the eyes of affected people may possibly emanate from laser beams, it may also be preferred to use conventional visible light.

In a preferred embodiment, the projection unit is furthermore equipped with a sensor unit for optical distance and/or movement measurement within the spatial vicinity of the mobile platform. The sensor unit can operate, for example, with laser beams and/or radio waves. With this sensor unit, obstacles, for example objects or people, can be detected such that the transport robot can react accordingly. If, for example, an obstacle is detected, an evasive trajectory, that is to say an evasive route, can be calculated. This evasive route can likewise be indicated using the projection unit according to the disclosure such that the possibly affected person is informed that the transport robot will take this other route. If an obstacle, for example a person, is detected on the planned movement path of the mobile platform, an acoustic signal may furthermore be emitted, for example a suitable message using a speech computer.

The signal transmission of the projection unit can furthermore be adapted such that, if a person is detected within the vicinity of the mobile platform, the signal transmission can at least partially be switched off or reduced in terms of its intensity so as to avoid disturbing or endangering the person by the light beam or possibly the laser beam. Provision may furthermore be made for the projection of the movement path to be aimed at mounted infrastructure measures, for example mirrors and/or reflectors and/or special paint markings, which are applied in the spatial vicinity of the mobile platform. The visibility of the projection for the affected people can thus be further increased.

A monitoring calculation unit is advantageously integrated into the projection unit and/or a monitoring calculation device is assigned to the projection unit, wherein the projection is controlled by the calculation unit.

The disclosure furthermore comprises a self-directing mobile platform which comprises at least one of the already described projection units. The mobile platform can be, for example, a freely moving transport robot and/or a freely moving transport device of a transport robot. The mobile platform according to the disclosure can moreover also be intended for other applications, independent of transport. With respect to further features of the mobile platform and in particular of the projection unit, reference is made to the above description.

The disclosure furthermore comprises a method for operating a self-directing mobile platform, in particular an autonomous, freely moving transport robot and/or one or more freely moving transport devices of a transport robot, wherein the future planned movement path of the self-directing mobile platform is projected in the spatial vicinity of the mobile platform. According to the disclosure, provision may furthermore be made for an optical distance and/or movement measurement to be carried out within the spatial vicinity of the mobile platform so as to be able to detect obstacles, such as objects and in particular people. A corresponding sensor unit can operate for example using laser beams and/or radio waves. If a person or another obstacle is detected within the vicinity of the self-directing mobile platform, an alternative movement path can be projected such that an affected person is informed accordingly. If a person is detected within the vicinity of the mobile platform, provision may furthermore be made for the projection of the movement path to be at least partially switched off or reduced in terms of its intensity so as to avoid disturbing or damaging an affected person.

The disclosure finally comprises a computer program which executes all the steps of the described method when it is executed on a calculating unit or a control unit, in particular a monitoring calculation unit of the projection unit according to the disclosure, and a corresponding computer program product with program code which is stored on a machine-readable carrier.

Further features and advantages of the disclosure result from the following description of the exemplary embodiments in conjunction with the drawings. The individual features can in this case be implemented alone or in combination with one another.

DETAILED DESCRIPTION

Figure 1:
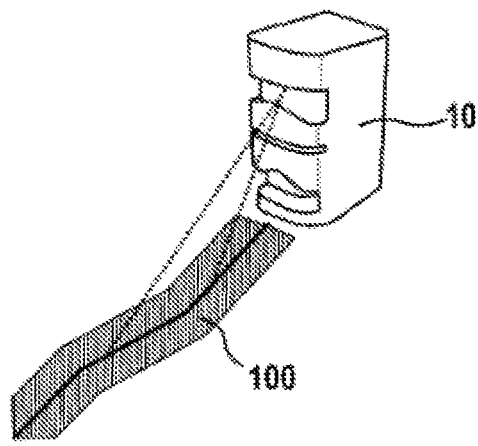
FIG. 1 shows a schematic illustration of a transport robot with projection of the movement path according to a first embodiment of the disclosure.

FIG. 1 illustrates a transport robot 10 as a self-directing mobile platform which moves freely in space. The transport robot or the mobile platform is equipped on the inside with a projection unit (not illustrated in detail). The planned or calculated movement path 100 is optically projected onto the underground using the projection unit. The movement path 100 in the form of a virtual transport track is clearly visible for people within the spatial vicinity of the transport robot 10. The virtual transport path 100 is configured in this embodiment as a band with the width of the transport robot 10 having a central strip with a stronger intensity than the remaining band. The virtual transport track 100 indicates to the affected people on which path the transport robot 10 will continue to move, such that the affected people can move out of said movement path without being rushed. The future movements of the transport robot are therefore very easily predictable by the affected people, such that inconveniences, for example hectic movements to move out of the path, are avoided and generally the acceptance for autonomously moving platforms or transport robots is increased.

Figure 2:
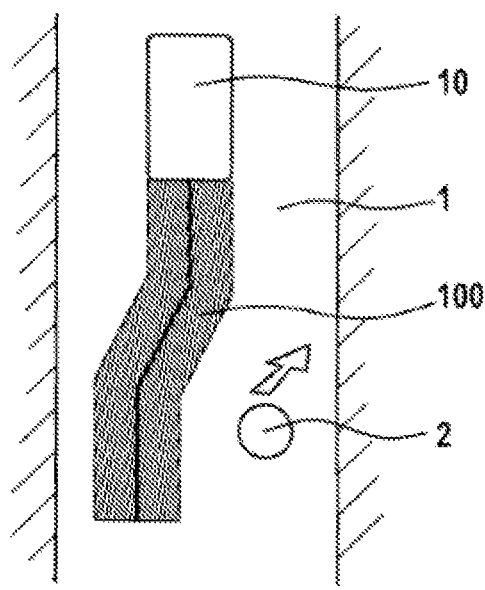
FIG. 2 shows a plan view of a transport robot with projected movement path within a corridor.

FIG. 2 schematically illustrates a plan view of the transport robot 10 and the virtual transport track 100 projected by the projection unit of the transport robot 10, which represents an evasive route. The transport robot 10 in this example travels through a corridor 1 in which a person 2 is situated. The transport robot 10 comprises a detection unit with which it can capture an obstacle, in the present example the person 2, within the spatial vicinity of the transport robot 10 using an optical distance and/or movement measurement. This information is taken into account when calculating the trajectory. An evasive route 100 is calculated and projected. Said evasive route 100 is visible to the person 2. The person 2 therefore knows that the transport robot 10 will drive around him or her. The person 2 can thus either stand still or move in the direction of the arrows so as to safely avoid collision with the transport robot 10.

For example a micro-laser projection unit known per se can be used in the projection unit, which laser projection unit can produce a sharp image on any desired surfaces. LIDAR sensors (LIDAR=light detection and ranging), which are based on the use of laser beams, can be used, for example, for the sensor and detection unit. Both the projection unit and the detection unit for capturing the vicinity can be combined with one another and both can be incorporated in one unit. This is particularly advantageous since both systems in principle use the same projection technology.

Figure 3:
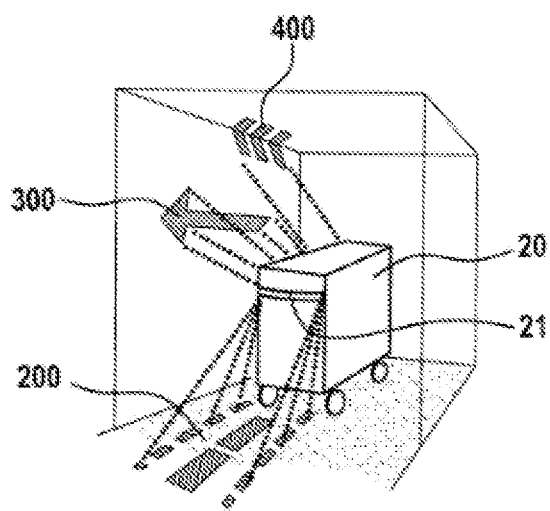
FIG. 3 shows a schematic illustration of a transport robot with projection of the movement path according to a further embodiment of the disclosure.

FIG. 3 illustrates a further example for an autonomous, freely moving transport robot as a self-directing mobile platform. In this embodiment of the transport robot 20, the projection unit 21 is implemented such that the movement path 200 is projected on the floor, on the wall (arrow 300) and on the ceiling (arrows 400). A virtual transport path 200 is indicated on the floor by way of a plurality of interrupted lines. In the present example, a central line consisting of a plurality of successive broad strips and two interrupted outer thin outlines, which indicate the width of the transport robot 20, are projected. The arrow 300 on the wall clearly shows the direction of the transport robot 20. The same is true of the successively arranged arrows 400 which are situated on the ceiling in the region of the angled edge of the wall. Using these various optical signals, the planned trajectory is very clearly visible to a person within the vicinity of the transport robot. Independently of the respective position of a person, said signals in this region cannot be overlooked, and therefore the movement direction and the movement path for people in this region are clearly identifiable such that the people can react accordingly. In general, the various projection possibilities of the disclosure allow various variants for representation of direction, the travel intentions and other activity messages.

Figure 4:
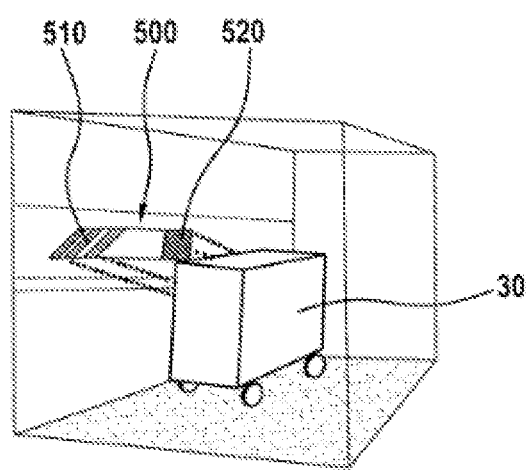
FIG. 4 shows a schematic illustration of a transport robot with projection of the movement path according to a further embodiment of the disclosure.

FIG. 4 shows a further possibility in terms of the projection according to the disclosure for indicating the movement path of the transport robot 30. In this example, the projection 500 is cast onto the wall, laterally of the transport robot 30. The projection 500 is subdivided into an arrow-shaped projection 510 which indicates the movement direction. The projection 500 furthermore comprises a graphic illustration 520, which can provide further messages for people within the vicinity of the transport robot 30 in the form of pictograms or the like, for example.

The various projections can be directed at previously mounted infrastructure measures within the movement vicinity of the transport robot. By way of example, minors are suitable, which mounted at places in a corridor which offer limited visibility. Alternatively, special wall regions can also be used as reflectors or, using particular paint markings, for projecting the movement path so as to further support the effect of the projection.

In these various embodiments of the disclosure, the various regions of close visibility for the affected people within the vicinity, for example up to 1 m, and in the farther vicinity, for example more than 1 m, can be supplied with the necessary information. The various possible variations in the projection representation moreover permits people to be present in the marked region. For example, it is possible for suitable texts, symbols or pictograms to indicate that the presence in the marked regions is possible without any danger, depending on the planned trajectory of the transport robot. For this possibility it is particularly preferred that the virtual travel path is not represented as a solid surface area, but for example as a dashed line in the projection, so that no hesitation for entering this region occurs.

The various variations for the projection make it possible to accommodate the respective user requirements. By way of example, arrows which are designed with a correspondingly large surface area on the walls can help to accommodate the requirements of people with impaired eyesight.

For the projection unit, for example a single laser beam which is not modulatable in terms of its brightness can be used, which can be positioned as desired using a corresponding deflection unit, for example a micro-mirror. It is not possible in this way to project complex images onto the chosen projection surface. However, it is possible to project simple closed pictograms, for example. In a further embodiment, it is possible for the laser to be capable at least of being switched on and off such that a simple, for example a black-and-white, image or a corresponding image in the color of the respective laser can be represented on the projection surface. Owing to the intensity of the laser, it is possible to see a corresponding representation during daylight even with an unfavorable underground, for example on a dark industrial carpet.

For safety reasons, in particular with respect to damage to eyes caused by a laser beam, it is advantageous if the projection unit is coupled with a detection unit which can detect people within the vicinity of the transport robot and in particular within the region of the planned movement path. If a person is detected, the transport robot can stand still or take evasive manoeuvers. Furthermore, the projection unit can be switched off or reduced in terms of its output if a person is situated too close to the projection unit or approaches the latter. Provision may be made here for only that part of the projection to be switched off or dimmed which could in fact be perceived as disturbing.

One alternative to a laser in the projection unit is a correspondingly powerful lamp which can represent the necessary travel information or the movement path, for example supplemented by a mask, as suitable for the situation. Various masks can be slid over the lamp for example mechanically such that the light cone of the lamp is limited and is deflected, and the projection can take place accordingly. The light cone of the lamp can furthermore be brought into a specific shape by a mask to represent specific symbols. In this embodiment, a lamp can also be used to communicate various items of information with respect to the movement path and generally the trajectory of the transport robot to people situated within the vicinity of the transport robot.

The projection unit of the transport robot can be included in what is known as a laser lighting display or be coupled to such a laser lighting display. Said display projects the calculated and planned movement path on the ground and/or on the remaining surroundings of the mobile robot platform, for example in the form of interrupted lines, arrows, letters or other. The transport robot is furthermore equipped with a monitoring calculation device, for example a computer, which signals to the laser lighting display in what form, for example in terms of the respective symbol and the brightness, and when the projection is to take place. The laser lighting display and the monitoring calculation device are mounted for example in the upper region or on a mobile robot platform. The robot platform is additionally equipped with further components, in particular a drive, batteries, sensor system etc., as in conventional transport robots. The monitoring calculation device generally has information on the instantaneous state of the robot platform, for example with respect to the position, the travel direction, detected people in the surroundings etc. On the basis of said state, a situation-specific command for a visual signal is sent from the monitoring calculation device to the laser lighting display. The laser lighting display projects the correspondingly specified signal into the vicinity of the mobile robot platform, in particular in the direction of the planned movement path. Said signal is visible to people within the vicinity of the transport robot such that said people can react accordingly.

What is claimed is:

1. A system for generating projected movement paths in a self-directing mobile platform comprising:
   a sensor unit configured to generate sensor data corresponding to an object within a predetermined distance of the self-directing mobile platform;
   a projection unit configured to generate an indicia of a path of movement for the self-directing mobile platform; and
   a calculation unit operatively connected to the sensor unit and the projection unit, the calculation unit being configured to:
     identify a position of the object with reference to the sensor data;
     generate a movement path for the self-directing mobile platform that avoids a collision with the object;
     operate the projection unit to emit light at a first intensity level to project a first depiction of the movement path on a surface proximate to the self-directing mobile platform, the first depiction of the movement path not intersecting with the object prior to movement of the self-directing mobile platform along the movement path; and
     operate the projection unit to emit light at a second intensity level, the second intensity level being less than the first intensity level, in response to the self-directing mobile platform moving to within a predetermined distance of the object.

2. The system of claim 1, the projection unit further comprising:
   a micro-laser unit configured to produce a predetermined two-dimensional optical pattern on the surface for the first depiction of the movement path of the self-directing mobile platform.

3. The system of claim 1, the projection unit being further configured to:
   project the first depiction of the movement path on at least one of a floor, a wall, and a ceiling proximate to the self-directing mobile platform.

4. The projection unit according to claim 1, the projection unit being further configured to project the depiction of the movement path including at least one of a graphical or text symbol.

5. The system of claim 1, the calculation unit being further configured to:
   operate the projection unit to project a second depiction of a region around the first depiction of the movement path onto the surface proximate to the self-directing mobile platform, the second depiction including a region of the surface around the self-directing mobile platform that is permissible for movement of the object concurrent to movement of the self-directing platform along the movement path.

6. The system of claim 1, the sensor unit further comprising a light detecting and ranging (LIDAR) device.

7. The system of claim 1, the sensor unit further comprising a radio wave transmitter and receiver.

8. The system of claim 1, the calculation unit being further configured to:
   deactivate the projection unit in response to the self-directing mobile platform moving to within the predetermined distance of the object.

* * * * *